United States Patent [19]

Hansen

[11] 4,445,011

[45] Apr. 24, 1984

[54] FREESTANDING MULTIDIRECTIONAL ELECTRICAL CONTROL DEVICE

[76] Inventor: Ronald E. Hansen, 918 River Bend Rd., NW., Salem, Oreg. 97304

[21] Appl. No.: 310,958

[22] Filed: Oct. 13, 1981

[51] Int. Cl.³ .................. H01H 25/00; H01H 29/00; H01H 35/00; H01H 9/00

[52] U.S. Cl. .................. 200/52 R; 200/6 A; 200/157; 200/182; 200/185; 200/187; 200/220; 200/224

[58] Field of Search .............. 200/6 A, 52 R, 61.47, 200/61.52, 157, 61.85, 183, 187, 185, 215–218, 219, 220, 224, 225

[56] References Cited

U.S. PATENT DOCUMENTS

| | | | |
|---|---|---|---|
| 2,093,419 | 9/1937 | Coleman | 200/61.47 |
| 2,094,887 | 10/1937 | Herz | 200/220 X |
| 2,138,279 | 11/1938 | Kneisley | 200/183 |
| 2,218,014 | 10/1940 | Wlochall | 200/220 X |
| 2,244,346 | 6/1941 | Rickmeyer | 200/187 |
| 2,260,689 | 10/1941 | Miller | 200/61.85 X |
| 2,757,749 | 8/1956 | Cooper et al. | 200/61.52 X |
| 2,782,276 | 2/1957 | Woods | 200/61.47 |
| 2,830,160 | 4/1958 | Engel et al. | 200/185 |
| 2,841,659 | 7/1958 | Eitel | 200/6 A X |
| 3,018,750 | 1/1962 | Hill | 200/6 A X |
| 3,035,132 | 5/1962 | Gorike et al. | 200/61.47 |
| 3,228,019 | 1/1966 | Visceglia | 200/61.47 |
| 3,259,202 | 7/1966 | Griffeth | 200/61.52 X |
| 3,283,088 | 11/1966 | Scow et al. | 200/17 R |
| 3,371,171 | 2/1968 | Gregory | 200/61.47 X |
| 3,499,131 | 3/1970 | Gutting | 200/224 X |
| 3,787,647 | 1/1974 | Hughes | 200/61.47 |
| 3,846,748 | 11/1974 | Hopwood | 200/61.47 X |
| 3,935,669 | 2/1976 | Potrzuski et al. | 46/228 |
| 3,946,359 | 3/1976 | Henderson | 200/61.47 X |
| 4,004,114 | 1/1977 | Baduel | 200/61.56 |
| 4,124,787 | 11/1978 | Aamoth et al. | 200/6 A |
| 4,201,900 | 5/1980 | Marchev | 200/220 |

Primary Examiner—Scott: J. R.
Attorney, Agent, or Firm—Klarquist, Sparkman, Campbell, Leigh & Whinston

[57] ABSTRACT

A freestanding multidirectional control device for use in controlling video display images in electronic game machines comprises a handle member connected by a multiconductor cable to electric circuitry in the game machine. The handle member contains two pairs of gravity switches electrically connected to separate output signal conductors in the cable. The pairs of switches are mutually normal along the vertical axis of the handle member. The switches in each pair are oppositely inclined from vertical so that tilting the handle member one way produces an output signal on one of the conductors and tilting it in the opposite direction produces such a signal on a different conductor. The pairs of switches can be either single-ended, two-position tilt switches or double-ended, three-position tilt switches. At least one of the liquid contact switches may contain at least one electrode comprising a length of electrically resistive material to form a variable resistance electrical conduction path.

7 Claims, 9 Drawing Figures

FREESTANDING MULTIDIRECTIONAL ELECTRICAL CONTROL DEVICE

BACKGROUND OF THE INVENTION

This invention relates generally to manually-operable, multidirectional control devices and more specifically to electrical joystick controls for controlling spatial variables in electrical apparatus such as video displays and the like.

Directional controllers, popularly known as "joysticks," are widely used for controlling a variety of electrical devices, such as video displays in electronic amusement and instructional machines requiring positional or directional control in two dimensions. Known joysticks typically employ an elongated handle or lever pivotally mounted on a base for angular movement relative to the base about a nominal vertical axis. Manipulation of the handle generates switch closures to transmit electrical control signals from the joystick corresponding to the direction of movement of the handle. Because such control devices typically utilize pressure switches and springs to restore the handle to a vertical position, a certain amount of force is required to manipulate the handle. Continuing use of these controls over an extended period of time tends to fatigue the users.

In an attempt at correcting this disadvantage, Aamoth, et al. proposed, in U.S. Pat. No. 4,124,787, an improved joystick control mechanism. Their design sought to reduce the force needed to activate the switches and thereby minimize user fatigue. However, it failed to solve these problems. With the explosive growth of video display games, many of which are operated by joysticks similar to the Aamoth, et al. design, a previously unknown wrist disability has become so commonplace that it has acquired a nickname—Space Invaders Wrist.

Several features of the Aamoth, et al. design and other prior control mechanisms are disadvantageous and some are believed to contribute to the aforementioned wrist disability. One such feature is that the handle is pivoted relative to a fixed base. The disadvantage is that the user must employ two hands, one to hold down the base and the other to manipulate the handle. Another disadvantage is that the handle must be manipulated in an unnatural manner. More specifically, it must be pivoted about a pivot point within the base, whereas the normal pivoting action of a person's fist is about the wrist and forearm. A further disadvantage arises from the use of restorative springs and pressure switches which necessitate the application of a certain amount of force to pivot the joystick sufficiently to actuate the switches. It would be preferable to have a multidirectional controller which avoids these disadvantages.

Besides the aformentioned pressure switches, several types of switches are known which are actuated in response to position or movement. U.S. Pat. No. 3,935,669 to Potrzuski, et al. discloses a switch mechanism which is actuated in response to centrifugal force due to rotation about any of three axes. U.S. Pat. Nos. 3,787,647 to Hughes and U.S. Pat. No. 4,201,900 to Marchev disclose fluid-type gravity switches of various configurations. However, none of these devices are known to have been used for electrically controlling multidirectional variables. More specifically, these patents do not disclose a joystick or similar electrical control apparatus for controlling movement or position of images in an X–Y plane on a video display. Nor do they disclose gravity switches arranged to control movement or position of a variable in both positive and negative directions along a single axis. Similarly, they do not disclose switches capable of controlling signal magnitude as well as direction.

Accordingly, there remains a need for a multidirectional control device for controlling spatial variables in an electrical apparatus, such as the X–Y control circuits of a video display device, without the disadvantages of prior joystick control mechanisms.

SUMMARY OF THE INVENTION

One object of the invention is to provide an improved multidirectional control device for manually controlling images on a video display device.

A second object of the invention is to provide a joystick controller which can be operated by the use of only one hand.

A third object is to avoid the physical disabilities due to extended use of prior joystick controllers.

Another object is to more closely adapt joystick controllers to the natural movements of a person's hand.

A further object of the invention is to enable control of image position and movement in both positive and negative directions along the X-axis and Y-axis.

Yet another object is to enable variable control of signal magnitude.

To meet the foregoing objects, the invention provides for a multidirectional control device for generating electrical control signals for manually controlling electrical apparatus in two dimensions. The control device is a freestanding, elongated handle member having a nominal vertical axis along its length. The handle member contains at least two electrical gravity or liquid contact switches, such as mercury tilt switches. The switches are positioned normal to one another when viewed along the vertical axis. They are angled from the vertical axis so that tilting the handle member in a first direction away from such axis actuates one switch and tilting the handle member in a second direction away from such axis actuates the other switch. The switches have one electrode connected to an output signal line to the controlled electrical apparatus and a second electrode connected to a power or ground line to provide an electrical potential across the electrodes. Control in both positive and negative directions in an X–Y plane can be provided by four such switches arranged in orthogonal pairs, the switches within each pair being angled in opposite directions from the vertical axis. Alternatively, two liquid contact switches, each having electrode pairs at both ends, can be used. For control of signal magnitude as well as direction is desired, a gravity rheostat comprising a tilt switch in which at least one of the electrodes is a resistive wire can be used. Depending on the attitude of the rheostat, the contact liquid forms an electrical contact at different locations along the resistive wire to control the magnitude of the signal. The switches are preferably positioned within the handle as closely as possible to the axes of rotation of a person's hand about the wrist. The handle member is preferably freestanding, rather than pivotally mounted in a base.

The foregoing and other objects, features and advantages of the invention will become more apparent from the following detailed description of preferred embodiments of the invention which proceeds with reference to the accompanying drawing.

DESCRIPTION OF PREFERRED EMBODIMENTS

Figure 1:
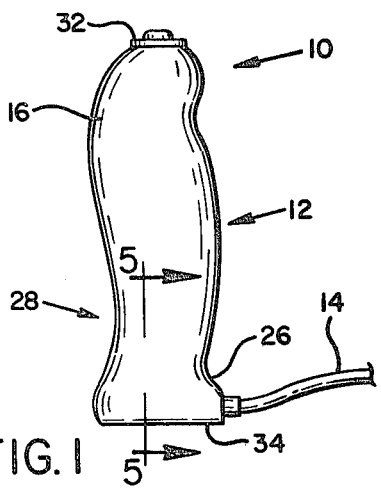
FIG. 1 is a side elevational view of a multidirectional control device in accordance with the invention.
Figure 2:
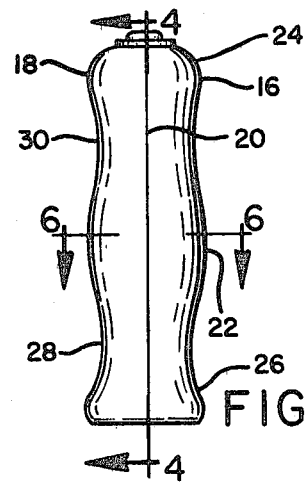
FIG. 2 is a rear elevational view of the device of FIG. 1.

Referring to FIGS. 1 and 2, a multidirectional electrical control device 10 comprises a freestanding handle member 12 connected by a multiconductor cable 14 to a spatially-controlled electrical apparatus, such as an electronic game machine (not shown), containing electrical circuits for controlling the position of an image along the X-axis and Y-axis of a video display. The handle member is a casing formed in two shell-like halves 16, 18 mated together along a parting line 20. The casing is generally shaped so as to be comfortably gripped in a person's hand. Preferably, it is enlarged in the region of its midsection 22 and at its upper and lower ends 24, 26 and constricted in regions 28, 30 immediately above and below its midsection. A conventional pushbutton switch 32 is mounted in the top of the handle member in position to be depressed by the user's thumb. The bottom side 34 of the handle member is preferably flat and of sufficient area that the handle member will stand upright when placed on a flat horizontal surface.

Figure 4:
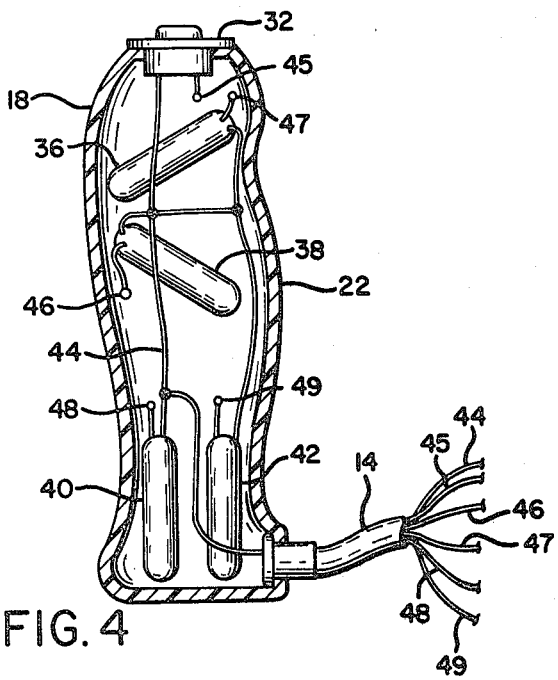
FIG. 4 is a side elevational view of the device of FIG. 1 with half of the casing split along line 4—4 in FIG. 2 being removed, portions of the wiring being omitted for clarity.
Figure 5:
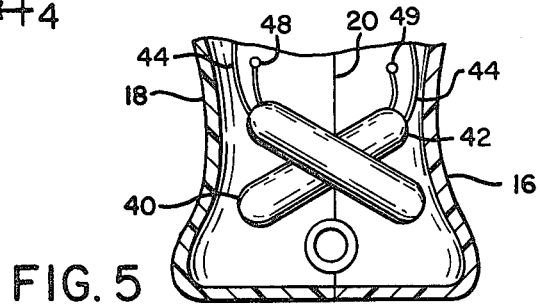
FIG. 5 is a cross-sectional view taken along line 5—5 in FIG. 1 showing the X-axis switches in rear elevational view.

Referring to FIGS. 4 and 5, the handle member contains a first pair of mercury tilt switches 36, 38 inclined in opposite directions from front to rear and positioned one above the other in the midsection and upper portions of the handle. The switches can be any of the various designs disclosed in U.S. Pat. No. 4,201,900. A second pair of mercury tilt switches 40, 42 are mounted in the lower portion of the handle member. These switches are inclined from side to side in opposite directions from vertical. The electrode ends of the tilt switches are elevated and, therefore, normally open when the handle member is in an upright position. Those skilled in the art will appreciate that, for use in appropriate control circuits, the electrodes may be positioned at the lower ends of the switches in a normally closed position, and that such operation would be equivalent to that described herein.

Figure 3:
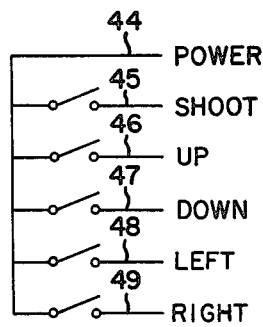
FIG. 3 is a wiring diagram of the device of FIG. 1.

Referring to FIGS. 3–5, the pushbutton switch 32 and each of the mercury tilt switches has a pair of electrodes. One electrode in each of these switches is connected to a single conductor 44 for connection in turn to a power source in the electrical device to be controlled. The second electrode of the pushbutton is connected to a separate conductor 45 for transmitting an electrical signal upon closure of the pushbutton switch to a "shoot" or similar function in a conventional electrical circuit controlling the video display in an electronic game.

The upper pair of tilt switches have their second electrodes connected to separate conductors 46, 47. Depending on whether the upper end of the handle member is tilted toward or away from the user, one or the other conductor transmits a signal to the game machine. Conventional electrical control circuits in the machine respond to the signal to actuate movement of an image in the video display either up or down, that is positively or negatively in a Y-axis.

The second electrodes of the lower tilt switches 40, 42 are also connected to separate conductors 48, 49 for transmitting signals to the video display to cause an image to move left or right, that is, in a negative or positive direction along an X-axis, depending upon whether the user tilts the upper end of the handle member left or right.

Persons skilled in the art will appreciate that the relationships of the electrical signals transmitted through the switches can be modified without altering the arrangement and function of device 10. For example, the control circuitry in the electrical apparatus can be arranged so that conductor 44 is grounded and conductors 46, 48 are positive polarity and conductors 47, 48 are negative. In either case, the switches of each pair provide mutually exclusive signals to the control circuitry.

Figure 6:
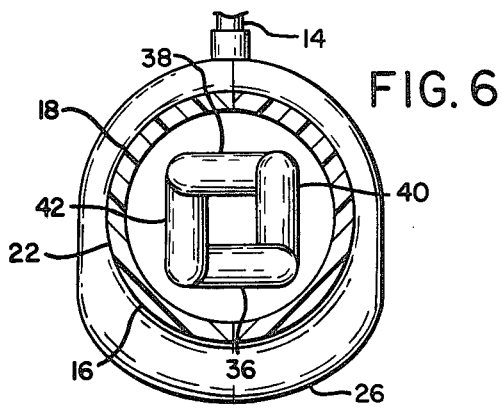
FIG. 6 is a cross-sectional view taken along line 6—6 in FIG. 2 showing a first alternative switch arrangement of the apparatus of FIG. 1 in top plan view, the wiring being omitted for clarity.

Referring to FIG. 6, two pairs of tilt switches can alternately be clustered in an overlapping fashion in the enlarged midsection 22 of the handle member. The relative attitudes of the tilt switches are the same as described above with reference to FIGS. 4 and 5. However, clustering the switches in midsection 22 positions them substantially at the intersection of the natural axes of rotation of the human hand when tilting the upper end of the handle member left and right and from front to rear. This arrangement minimizes sloshing of the mercury in the tilt switches because the switches are subjected almost solely to tilting movement during manipulation of the joystick.

Figure 7:
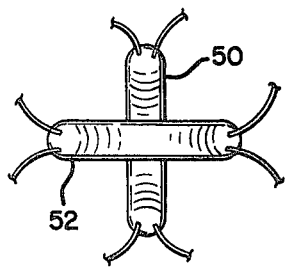
FIG. 7 is a top plan view of a second alternative switch arrangement of the device of FIGS. 1 and 2, using three position tilt switches.
Figure 8:
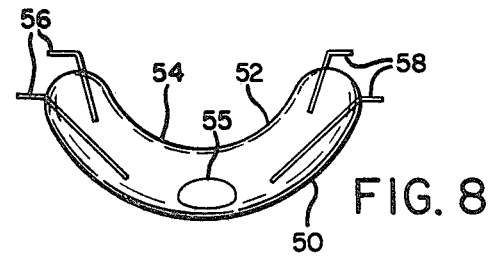
FIG. 8 is a longitudinal cross-sectional view of one type of switch usable in the arrangement of FIG. 7.

In FIG. 7, a switch arrangement functionally equivalent to the arrangement of FIG. 6 is formed by nesting two curved, double-ended, three-position tilt switches 50, 52 together. Referring to FIG. 8, such a switch comprises a curved nonconductive tube 54 containing a pool of mercury 55 and having two pairs of electrodes 56, 58. One pair of electrodes is positioned in each end of the tube so that one or the other of the pairs of electrodes is closed when the tube is rocked in one direction or the other. One such switch functions in the same manner as the pair of tilt switches 46, 47 in FIG. 4. That is, when the handle member is upright, the pool of mercury is centered in the tube and both pairs of electrodes are open. When the handle member is tilted in either direction one or the other of the pairs of electrodes is closed.

Figure 9:
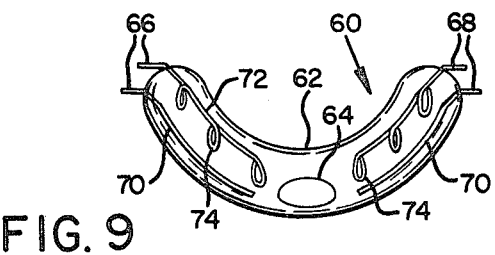
FIG. 9 is a longitudinal cross-sectional view of a second type of switch usuable in the arrangement of FIG. 7.

Referring to FIG. 9, the tilt switches of FIG. 7 can be designed so as to also provide a variation in signal amplitude depending on the degree of tilt of the handle member. Switch 60 comprises a tube 62 and pool of mercury 64 which normally rests in the center of the tube when untilted. Pairs of electrodes 66, 68 are positioned in opposite ends of the tube. These electrodes differ from electrodes 56, 58 in that they are somewhat longer and are of resistive wire. The lower electrode 70 of each pair extends along the lower inner surface of the tube to a position near but spaced apart from the sides of the mercury pool 64. The upper electrode 72 of each pair extends generally parallel to the lower electrode and is spaced above it so that electrical contact is made between the two electrodes of a pair by the mercury pool when tube 62 is tilted.

Electrode 72 has loops 74 formed at intervals along its length. These loops serve two functions. First, they increase the resistive path length along electrode 72. Secondly, they provide contact points at discrete intervals for the mercury pool to bridge between the upper and lower electrodes. This arrangement enables a stepwise variation in signal amplitude through each pair of electrodes depending on the degree of tilt of the switch. This capability is useful in certain types of video displays for controlling not only the direction of movement of an image on the display but its velocity.

OPERATION

The multidirectional control device 10 is electrically connected to an electronic game machine in the same manner as, for example, the joystick controller mechanism of U.S. Pat. No. 4,124,787. However, rather than positioning the controller on a table and holding its base in one hand, the handle member is merely grasped in the user's hand and held in an upright position, apart from any support surface. The handle member is positioned with wire 14 extending away from the user's body. The user's thumb is positioned on pushbutton 32. To cause an image on the video display to move down or up, that is, in a negative or positive direction along the Y-axis, the user merely tilts the upper end of the handle member away from or toward himself, respectively. To make the image move right or left, that is, in a positive or negative direction along the X-axis of the display, the user tilts the upper end of the handle member right or left, respectively. To shoot, the user depresses button 32 using the thumb of the same hand that grasps the handle member.

Having illustrated and described the principles of my invention in a preferred embodiment and variations thereof, it should be apparent to those skilled in the art that modifications can be made in arrangement and detail without departing from such principles. Accordingly, I claim all modifications falling within the spirit and scope of the following claims.

I claim:

1. A multidirectional control device for generating electrical control signals for a spatially controlled electrical apparatus, comprising:
   a handle member having a nominal vertical axis defining a handle position such that the control device is not actuated;
   a first gravity switch having a first switch axis positioned in said handle at an angle from the vertical axis such that tilting the handle member in a first direction away from said vertical axis and toward said first switch axis actuates said first switch;
   a second gravity switch having a second switch axis positioned in said handle at an angle from the vertical axis such that tilting the handle member in a second direction away from said vertical axis and toward said second switch axis actuates said second switch;
   a third gravity switch having a third switch axis positioned in said handle at an angle from the vertical axis such that tilting the handle oppositely of said first direction actuates said third switch; and
   a fourth gravity switch having a fourth switch axis positioned in said handle at an angle from the vertical axis such that tilting the handle oppositely of said second direction actuates said fourth switch;
   said switches each including an electrode electrically connected to a separate output signal line to said controlled apparatus and mutually-independent switch closure means operable for actuating each switch independently of the other;
   said first and second switches having their axes extending at an angle to one another such that their output signal lines provide separate directional control signals to the controlled apparatus which correspond to X and Y variables in an X-Y plane and simultaneously provide both of said separate control signals when the handle is tilted in a direction angularly intermediate said first and second directions; and
   said third and fourth switches having their axes positioned at an angle to one another such that their output signal lines provide separate directional control signals to the controlled apparatus which correspond to negative X and Y variables in said X-Y plane.

2. A device according to claim 1 in which each of said switches is a liquid contact switch.

3. A device according to claim 2 in which the first and third switches and the second and fourth switches are defined by two double-ended, three-position liquid contact switches positioned substantially normal to one another.

4. A device according to claim 3 in which at least one of said double-ended liquid contact switches comprises a tube concavely curved in an upward direction, and at least one of said electrodes comprises a length of electrically resistive material positioned and arranged in the tube so as to be bridged by a pool of liquid conductor at different lengthwise positions to form a variable resistance electrical conduction path as the handle member is tilted at angles of different magnitudes from vertical.

5. A joystick controller according to claim 1, in which the handle member comprises a freestanding elongated handle member having a nominal vertical axis extending along its length;
   the switches each being normally deactuated when the vertical axis of the handle member is parallel to the force of gravity; and
   at least one of the switches being positioned in the handle member so as to tilt therewith substantially about an axis of rotation of the human hand.

6. A controller according to claim 5 in which said first and third switches are positioned within a vertically central portion of the handle so as to lie within the palm of said hand when gripped for operation.

7. A controller according to claim 1 including a pushbutton switch means positioned atop the handle member for thumb manipulation, the pushbutton means being connected to a fifth output signal line to said controlled apparatus for providing a control signal thereto which is independent of the directional control signals.

* * * * *

UNITED STATES PATENT AND TRADEMARK OFFICE
CERTIFICATE OF CORRECTION

PATENT NO. : 4,445,011
DATED : April 24, 1984
INVENTOR(S) : RONALD E. HANSEN

It is certified that error appears in the above—identified patent and that said Letters Patent is hereby corrected as shown below:

Column 6, line 32, insert --normally open-- before "liquid contact switch."

Signed and Sealed this

Twenty-sixth Day of March 1985

[SEAL]

Attest:

DONALD J. QUIGG

Attesting Officer     Acting Commissioner of Patents and Trademarks